United States Patent
Poepperl et al.

(10) Patent No.: US 12,000,966 B2
(45) Date of Patent: Jun. 4, 2024

(54) METHOD AND ANALYSIS SYSTEM FOR DETERMINING A STATE OF A DIAPHRAGM OF AN ULTRASOUND SENSOR

(71) Applicant: Valeo Schalter und Sensoren GmbH, Bietigheim-Bissingen (DE)

(72) Inventors: Maximilian Poepperl, Kronach Neuses (DE); Raghavendra Gulagundi, Kronach Neuses (DE); Fabian Haag, Bietigheim-Bissingen (DE); Bastian Hafner, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 466 days.

(21) Appl. No.: 17/294,870

(22) PCT Filed: Nov. 7, 2019

(86) PCT No.: PCT/EP2019/080457
§ 371 (c)(1),
(2) Date: May 18, 2021

(87) PCT Pub. No.: WO2020/104195
PCT Pub. Date: May 28, 2020

(65) Prior Publication Data
US 2022/0011419 A1 Jan. 13, 2022

(30) Foreign Application Priority Data
Nov. 19, 2018 (DE) .......................... 102018129044.6

(51) Int. Cl.
*G01S 15/00* (2020.01)
*G01S 7/52* (2006.01)
(Continued)

(52) U.S. Cl.
CPC ........ *G01S 7/52004* (2013.01); *G01S 15/104* (2013.01); *G01S 15/34* (2013.01); *G01S 2007/52009* (2013.01); *G01S 15/931* (2013.01)

(58) Field of Classification Search
CPC ........... G01S 7/52004; G01S 15/00–34; G01S 15/104; G01S 15/931; G01S 2007/52009
See application file for complete search history.

(56) References Cited

U.S. PATENT DOCUMENTS

| 6,314,380 B1 | 11/2001 | Seip et al. |
| 2010/0329080 A1 | 12/2010 | Frank et al. |

(Continued)

FOREIGN PATENT DOCUMENTS

| CN | 101322044 A | 12/2008 |
| CN | 104115026 A | 10/2014 |

(Continued)

OTHER PUBLICATIONS

Office Action issued in Chinese Application No. 201980087108.X dated Jun. 21, 2023 (17 pages).

(Continued)

*Primary Examiner* — Nguyen Q. Ha
(74) *Attorney, Agent, or Firm* — Osha Bergman Watanabe & Burton LLP

(57) ABSTRACT

A method and an analysis system for determining a state of a diaphragm of an ultrasound sensor during operation is disclosed. The diaphragm of the ultrasound sensor is excited with a first excitation signal in a predefined first frequency profile. Based on this, a first voltage profile, which depends on a frequency of the first excitation signal, is measured. Analogously, a second voltage profile is determined by applying a second excitation signal to the diaphragm and then carrying out a measurement. These two voltage profiles are shifted so that respective positions of maxima of the two (Continued)

voltage profiles are matched to each other in a predefined frequency range. A third voltage profile, which runs between the shifted first and second voltage profiles, is determined. Based on the third voltage profile, electrical parameters are determined by a model for continuous excitation of the diaphragm to determine the state of the diaphragm.

15 Claims, 5 Drawing Sheets

(51) Int. Cl.
  *G01S 15/10* (2006.01)
  *G01S 15/34* (2006.01)
  *G01S 15/931* (2020.01)

(56) References Cited

U.S. PATENT DOCUMENTS

| | | | |
|---|---|---|---|
| 2012/0279283 | A1 | 11/2012 | Brengartner et al. |
| 2013/0331678 | A1 | 12/2013 | Lading et al. |
| 2015/0030169 | A1 | 1/2015 | Pan et al. |
| 2016/0113625 | A1 | 4/2016 | Kim et al. |
| 2016/0223658 | A1 | 8/2016 | Hallek et al. |
| 2017/0353795 | A1 | 12/2017 | Hu et al. |
| 2019/0004163 | A1 * | 1/2019 | Schneider ............ G01S 15/931 |
| 2021/0396873 | A1 * | 12/2021 | Haag .................... G07C 5/0808 |

FOREIGN PATENT DOCUMENTS

| | | | | |
|---|---|---|---|---|
| CN | 104750978 | A | 7/2015 | |
| CN | 104808195 | A | 7/2015 | |
| CN | 105556336 | A | 5/2016 | |
| CN | 105916079 | A | 8/2016 | |
| CN | 108007557 | A | 5/2018 | |
| CN | 108307284 | A | 7/2018 | |
| CN | 108654967 | A | 10/2018 | |
| DE | 102009039083 | A1 | 3/2011 | |
| DE | 102013108001 | A1 | 2/2014 | |
| DE | 102012216968 | A1 | 4/2014 | |
| DE | 102014201482 | A1 | 7/2015 | |
| DE | 112013005169 | T5 | 7/2015 | |
| DE | 102009040992 | B4 | 11/2015 | |
| DE | 102014113601 | A1 | 3/2016 | |
| DE | 102017105043 | A1 | 9/2018 | |
| DE | 102017128837 | A1 | 6/2019 | |
| DE | 102018119266 | B3 | 9/2019 | |
| EP | 1582889 | A1 | 10/2005 | |
| EP | 2618177 | A1 * | 7/2013 | ............ G01S 15/36 |
| EP | 2899563 | A1 | 7/2015 | |
| EP | 2962643 | A1 | 1/2016 | |
| EP | 3047300 | A1 | 7/2016 | |
| EP | 3324207 | A1 * | 5/2018 | ............ G01S 15/93 |
| KR | 2014-0108181 | A | 9/2014 | |
| KR | 2016-0055815 | A | 5/2016 | |
| SG | 64805 | A1 | 5/1999 | |
| WO | 1999009748 | A1 | 2/1999 | |

OTHER PUBLICATIONS

Niu Zijie, et al., "Impedance characteristics of ultrasonic motor based on parallel", Vibration, Testing and Diagnosis, vol. 38 No. 01, Feb. 15, 2018 (7 pages).
The Notice of Preliminary Rejection issued in Korean Application No. 2021-7018895 dated Nov. 23, 2022 (15 pages).
International Search Report and Written Opinion in corresponding International Application No. PCT/EP2019/080457, dated Feb. 24, 2020 (14 pages).
German Search Report in corresponding German Application No. 10 2018 129 044.6, dated Jul. 1, 2019 (5 pages).

* cited by examiner

METHOD AND ANALYSIS SYSTEM FOR DETERMINING A STATE OF A DIAPHRAGM OF AN ULTRASOUND SENSOR

The present invention relates to a method for determining a state of a diaphragm of an ultrasound sensor during operation of the ultrasound sensor. This invention also relates to an analysis system for a motor vehicle having an ultrasound sensor which has a diaphragm.

Ultrasound sensors are often used in motor vehicles in order to obtain information about an environment of the motor vehicle. Ultrasound waves, which are often phase-modulated in different ways, are used in this case. A common phase modulation is the binary phase shift. This is a phase shift of 180 degrees. Since exactly two states can be coded with this, this phase shift is often referred to as a binary phase shift (BPSK). As a rule, the entire frequency spectrum is used at any point in time during the transmission process. It is therefore not possible to assign a point in time to a specific frequency because the transmission spectrum has a mixture of different frequencies.

Many ultrasound sensors have a diaphragm. A behavior of the diaphragm is usually highly dependent on the frequency of an excitation signal. This diaphragm behavior is also strongly influenced by different states of the diaphragm. These states can be, for example, a covering of the diaphragm with ice or with contaminants and different temperatures of the diaphragm. Additional sensors are often used to more accurately predict the diaphragm behavior of the diaphragm in the ultrasound sensor. Since these additional sensors are usually installed at a different location than the ultrasound sensors, there is the disadvantage that the sensor data can locally diverge.

The published patent application DE 10 2014 201 482 A1 describes a method and a device for detecting a malfunction of an ultrasound transducer by evaluating an impedance envelope curve. An excitation signal is applied to the ultrasound transducer in this case, and an impedance signal which describes the impedance of the ultrasound transducer is determined. An impedance envelope curve is generated from the impedance signal and is compared with a reference envelope curve. A malfunction is detected if the impedance envelope curve does not correspond to the reference envelope curve.

The patent specification DE 10 2009 040 992 B4 describes a method for detecting icing and soiling of ultrasound sensors. In this case, a diaphragm of the ultrasound sensor is excited by means of ultrasound waves at a predefined excitation frequency. A decay frequency is then observed for this excitation. A comparison of the excitation frequency with the decay frequency is used to deduce icing and/or soiling of the diaphragm.

The object of the present invention is to determine a state of the diaphragm of the ultrasound sensor more efficiently.

This object is achieved by means of the independent patent claims of this application. Meaningful developments result from the subclaims.

The invention provides a method for determining a state of a diaphragm of an ultrasound sensor during operation of the ultrasound sensor. The term "operation of the ultrasound sensor" means, in particular, transmission operation. The term "operating the ultrasound sensor" thus preferably means the transmission of the ultrasound sensor. The active emission of ultrasound waves by the ultrasound sensor is addressed with the operation of the ultrasound sensor. In many cases, it should be detected whether the ultrasound sensor or the diaphragm of the ultrasound sensor is soiled or covered with ice. Such states are often also referred to as blocked states. This means that the present invention can be used in particular to detect blocked states of a diaphragm of an ultrasound sensor.

Ideally, these states should not only be detected, but also be determined quantitatively. First, in a step a), a first excitation signal in a predefined first frequency profile is applied to the diaphragm of the ultrasound sensor. The predefined first frequency profile is generally not constant. However, in the case of the first excitation signal, the respective frequency of the first excitation signal is fixed in particular at each point in time. For example, the first frequency profile can start at a high frequency and end at a lower frequency. If this frequency range is run through evenly or linearly, it is possible to speak of a down-chirp signal. A frequency profile which rises or falls monotonously is preferably selected for the first excitation signal. This means that the first frequency profile of the first excitation signal preferably only has a frequency change in only one direction. Ideally, the first excitation signal therefore does not contain any change in the direction of the frequency change. This would be, for example, a frequency profile that initially rises and subsequently falls again later in the profile.

In a step b), a first voltage profile caused by the first excitation signal is measured as a function of a frequency of the first excitation signal. As a rule, the first excitation signal causes the diaphragm of the ultrasound sensor to vibrate. These vibrations of the diaphragm can be registered by a corresponding voltage drop or an induced voltage. Since a different voltage can be measured at each point in time, the first voltage profile is obtained when the voltage signals are measured. The first voltage profile thus corresponds in particular to many individual voltage measurements at different times. Thus, in step b), the reaction of the diaphragm due to the application of the first excitation signal is measured, in particular. The reaction of the diaphragm to this application of the first excitation signal can be expressed by the first voltage profile. The first voltage profile can thus be used as an indicator of the reaction behavior of the diaphragm.

In a step c), a second excitation signal having a second frequency profile that differs from the first frequency profile is applied to the diaphragm of the ultrasound sensor. The first frequency profile therefore differs from the second frequency profile. The statements relating to step a) analogously apply to step c). The first excitation signal preferably differs from the second excitation signal. A first frequency range can coincide with a second frequency range. The frequency range is usually determined by a minimum frequency and a maximum frequency. However, it is possible in particular for a frequency range to be run through differently. For example, the first frequency profile can represent a falling frequency profile and the second frequency profile can represent a rising frequency profile. This is particularly the case with chirp signals. A chirp signal is a term from signal processing technology. The chirp signal usually describes a signal whose frequency changes over time. A distinction can be made between positive chirp signals and negative chirp signals. In the case of positive chirp signals, the frequency of the signal increases over time; in the case of negative chirp signals, the frequency of the signal decreases over time. The frequency increase or frequency decrease can be linear or exponential. A positive chirp signal, in which the frequency always increases over time, is often also referred to as an up-chirp. Correspondingly, a negative chirp signal, the frequency profile of which steadily decreases, is referred to as a down-chirp. The up-chirp signal is preferably accordingly implemented in the opposite direction to the down-chirp signal. In particular, the up-chirp signal has the same frequency points as the corresponding down-chirp signal. In particular, the up-chirp signal can be designed to be point-symmetrical to the down-chirp signal. In this case, the up-chirp signal would run from a low frequency to a higher frequency. The corresponding down-chirp signal could therefore run from the same higher frequency to the same lower frequency. The respective frequency profile is, in particular, similar to that of the corresponding up-chirp or down-chirp signal, in which case the different frequency change has to be taken into account.

In particular, the first frequency profile of the first excitation signal differs from the second frequency profile of the second excitation signal. The two excitation signals are preferably used at different times. This means that the first and second excitation signals are preferably not applied to the diaphragm of the ultrasound sensor at the same time. The first excitation signal is ideally shifted in terms of time with respect to the second excitation signal. The two excitation signals preferably have further differences that go beyond this. Above all, different frequency profiles are addressed therewith.

Instead of the term chirp signals, the term "sweep" is also often used in the literature. A sweep can be a signal of constant amplitude, the frequency of which periodically and continuously runs through a predefined range. In contrast to an up-chirp signal or a down-chirp signal, a direction of the frequency change can be changed in a sweep signal. It is thus possible, for example, for the frequency to increase in a predefined subrange in a sweep signal and for the frequency of the excitation signal to decrease in another predefined subrange. The excitation signal can thus be designed differently. It can be in the form of a sweep signal, an up-chirp signal, a down-chirp signal or, in the simplest case, as a constant excitation signal. In the context of this invention, up-chirp signals and/or down-chirp signals are preferably used.

The first and/or second excitation signal can be a frequency-modulated signal. The two excitation signals can be periodic or sinusoidal. The first frequency profile is not identical to the second frequency profile. For example, the first excitation signal can be designed as a step function. Each step can represent a different frequency. The step function can be ascending, descending or a combination of these two possibilities. The frequency profile relating to the first excitation signal can be linear, quadratic and/or exponential. If, for example, the first excitation signal is designed as an up-chirp, the frequency of the first excitation signal increases over time. However, this increase may have different forms. It can be linear, quadratic, exponential and/or otherwise increasing. The same applies to a down-chirp signal. However, it is possible that the first excitation signal is not in the form of a pure up-chirp or down-chirp signal. In this case, the frequency of the first excitation signal can increase over time in a predefined first time interval. The frequency of the first excitation signal can decrease in another predefined second time interval. For example, the first excitation signal can have a sequence of rising and falling frequency ranges. Such a first excitation signal can thus enable triangular excitation. In the simplest case, the first excitation signal can be a signal at a constant frequency. Up-chirp or down-chirp signals are preferably used as the first or second excitation signal. The statements made in this paragraph about the first excitation signal analogously apply to the second excitation signal.

In a step d), a second voltage profile is measured as a function of a frequency of the second excitation signal, wherein the second voltage profile is caused by the second excitation signal. The same likewise analogously applies here to step d) as to step b). Thus, after step b) has been carried out, there are generally two different voltage profiles. These two voltage profiles are then evaluated in order to determine the state of the diaphragm.

For this purpose, in a step e), the first voltage profile is shifted by an amount in a first direction. Likewise, the second voltage profile is shifted by the same amount in a second direction, so that respective positions of maxima of the two voltage profiles are matched to each other in a predefined frequency range. The term "matched" does not necessarily mean that the two maxima must exactly correspond or coincide. It is sufficient if, after the matching in step e), a distance between the maxima does not exceed a predefined tolerance value. The distance between the two maxima can be expressed in particular in the form of a Euclidean distance. Shifting the first voltage profile and the second voltage profile thus results, in step e), in the first maximum of the first voltage profile in the first predefined frequency range being matched to the second maximum of the second voltage profile in the second predefined frequency range. These two maxima are brought closer to one another in particular by step e). Ideally, this matching results in a merging of the two maxima into a single point.

In a step f), a third voltage profile, which runs between the first voltage profile and the second voltage profile from step e), is determined. The first and second voltage profiles from step f) on are preferably used to address those voltage profiles that result from the shift in step e). The shifted first voltage profile preferably results from the first voltage profile which is shifted by the amount in the first direction. Explanations of voltage profiles that relate to step f) mean the shifted voltage profiles that result from step e). Similarly, the second shifted voltage profile results in particular from a shift or a translation of the second voltage profile by the same amount in the second direction. In particular, provision may be made for the two shifted voltage profiles to be able to be weighted differently. This can be achieved, for example, through different weighting factors. As a rule, it is not important whether the weighting factor is used before or after shifting the voltage profiles. If, for example, the first voltage profile is to be given a higher weighting than the second voltage profile, a larger weighting factor could be selected for the first voltage profile than for the second voltage profile. Ideally, both weighting factors for the two voltage profiles add up to 100 percent. In particular, provision may be made for the third voltage profile to correspond to a median with respect to the first and second voltage profile (shifted voltage profile).

In a step g), the state of the diaphragm is determined. This is done, for example, by determining at least one electrical parameter of a model for continuous excitation of the diaphragm. In addition, at least one parameter is compared with at least one predefined reference parameter. An effective resistance, an effective capacitance or an effective inductance, for example, can be considered as an electrical parameter. The diaphragm behavior is described in step g) by means of the model for continuous excitation of the diaphragm. This model assumes, in particular, that the diaphragm is excited with an excitation signal of constant frequency. This model can be described using an equivalent circuit diagram. In many cases, it is sufficient if only one parameter is compared with its associated reference parameter. As a rule, this is that parameter which exhibits the greatest deviation from its predefined reference parameter. The predefined reference parameter describes, in particular, a predefined state of the diaphragm. These reference parameters are preferably obtained by reference measurements. In this case, these reference measurements are carried out, in particular, with those states of the diaphragm which are to be determined later in the context of this method. For example, a reference measurement in which the diaphragm was covered with ice may have been carried out.

The reference parameters obtained in this way can be used in step g) to determine the state of the diaphragm. Other reference measurements can include blocked states of the diaphragm, for example. Reference measurements in which the diaphragm had a predefined degree of soiling may thus have been carried out in advance. The reference parameters obtained in this way can be used in step g) to determine whether the diaphragm is soiled. Ideally, not only the soiling per se, but also a degree of soiling can be additionally determined by means of the comparison in step g). This means that, in step g), the state of the diaphragm can be quantitatively determined. It is thus possible not only to determine binary distinctions in step g), but to quantitatively determine the states of the diaphragm. This method can be used separately for each individual ultrasound sensor. It is therefore possible to safely and reliably detect which ultrasound sensor is damaged or is currently out of operation.

The type of damage can also be determined. If, for example, it is detected that the diaphragm is covered with ice, it is foreseeable in this case that the ultrasound sensor can be put into operation again at higher temperatures in the future. If, however, the comparison in step g) shows that the diaphragm is damaged or broken, it is clear that this sensor in question is no longer permanently available. Ideally, the state of the diaphragm can be determined so precisely that a failure forecast of the ultrasound sensor in question is also possible. In this way, it is possible to quickly detect which ultrasound sensor needs to be replaced or which and how many ultrasound sensors need to be replaced in the future.

Another embodiment of the method provides for the first excitation signal to be in the form of a down-chirp signal and for the second excitation signal to be in the form of an up-chirp signal. A signal whose frequency changes over time is referred to as a chirp signal. With an up-chirp, the frequency increases over time. With a down-chirp, the frequency decreases over time. The first excitation signal is, in particular, an electrical signal. Theoretically, the first excitation signal can also be an acoustic signal. As a rule, however, an ultrasound sensor or its diaphragm is controlled with electrical signals. For example, an actuator based on piezo technology can be used for this purpose. The piezo element is often an integral part of the sound transducer element and is therefore also subjected to diagnosis. This means that in most cases the diaphragm is not considered in isolation. Associated components such as the piezo element are usually also included in the analysis. The piezo element can be understood as meaning a component that belongs to the diaphragm. A change in the state of the piezo element can also include in the determination of the state of the diaphragm. In most cases, the piezo element cannot be considered to be an external excitation source. A piezo element can excite the diaphragm by means of electrical signals. Electrical signals are preferably used as excitation signals. The same applies to the second excitation signal. An up-chirp signal is usually a signal whose frequency increases over time. The increase in this frequency may be different. For example, the frequency can increase monotonously over time. Instead, it can increase exponentially. A combination of different types of increase, i.e. a mixture of exponential and linear increase, is also possible. In other words, the first time derivative of the frequency profile in the case of the up-chirp signal is preferably always greater than zero. In the case of a down-chirp signal, the first derivative is usually always less than zero. The behavior of the diaphragm depends, in particular, on a chirp direction. The chirp direction means, in particular, a sign of the first derivative of the frequency profile. The chirp direction thus indicates whether the frequency of the chirp signal increases or decreases over time. Since the decay behavior of the diaphragm depends on the chirp direction, an up-chirp signal and a down-chirp signal are preferably used. It is therefore possible to achieve the situation in which the different decay behavior of the diaphragm can be taken into account when determining the state of the diaphragm. This enables more precise analysis of the state of the diaphragm.

Another variant of this invention provides for the state of the diaphragm to be additionally or alternatively determined on the basis of a comparison of a resonant frequency of the third voltage profile as the at least one parameter with a predefined resonant frequency as the predefined reference parameter. Instead of determining at least one electrical parameter of the model for continuous excitation, this variant therefore provides for the resonant frequency of the third voltage profile to be compared with the predefined reference resonant frequency. The state of the diaphragm can be determined on the basis of this comparison. In this case, the predefined resonant frequency represents a predefined state of the diaphragm. If the determined resonant frequency deviates from this predefined resonant frequency, the state of the diaphragm can be derived on the basis of this. Even a quantitative state of the diaphragm can preferably be determined from the degree of deviation. For example, if it is covered with ice, it is possible to determine how much ice is present on the diaphragm. The resonant frequency is defined, in particular, by a minimum of the third voltage profile in a predefined frequency range.

Another variant of this invention provides for the model for continuous excitation of the diaphragm to have a first resistance, a first inductance and a first capacitance in a parallel circuit and a second resistance, a second inductance and a second capacitance in a series circuit as the electrical parameters of the model. The following formula is used in particular:

$$Z = \left[ \frac{1}{i \cdot w \cdot L_p} + \frac{1}{R_p} + i \cdot w \cdot C_P + \frac{1}{i \cdot w \cdot L_s + \frac{1}{i \cdot w \cdot C_s} + R_s} \right]^{-1} \quad [1]$$

In formula 1, i represents the complex unit. Z is to be interpreted as voltage or as a variable based on the voltage. Here, Z often means an impedance of the diaphragm. w represents the angular frequency of the third voltage profile. $R_p$ represents the first resistance, $L_p$ represents the first inductance, and the first capacitance is represented by the variable $C_p$. In an equivalent circuit diagram, these parameters can be understood as elements of a parallel circuit. The parameter $R_s$ represents the second resistance, $L_s$ represents the second inductance and $C_s$ represents the second capacitance. These parameters are preferably combined in the series circuit in an equivalent circuit diagram. Formula 1 therefore contains exactly six electrical parameters. These electrical parameters can then be compared with other predefined reference parameters. In particular, provision may be made for a Euclidean distance to be determined between the six electrical parameters and a further six predefined electrical parameters. This Euclidean distance can subsequently be used as a state variable for determining the state of the diaphragm. In particular, it can be examined whether the Euclidean distance between the electrical parameters and the predefined electrical parameters exceeds or falls below a predefined tolerance value. If the distance exceeds the tolerance value, a blocked state of the diaphragm can be detected. With the aid of the electrical parameters, it is also possible to determine a temperature of the diaphragm.

Another variant of this invention provides for reference parameters to be predefined for predefined states of the diaphragm and for that exactly one electrical parameter of the model which has the greatest deviation from its associated reference parameter to be compared with the associated reference parameter in order to determine the state of the diaphragm. In this case, only a single electrical parameter is compared with exactly one associated reference parameter. Precisely that electrical parameter which has the greatest deviation or the greatest distance from its associated reference parameter is used for comparison. This can accelerate the method since the comparison process is simplified. This can be useful, for example, when certain predefined states are to be examined. If, for example, the ultrasound sensor is only to be examined for coverage with ice, it is possible that only certain or only exactly one electrical parameter of the model is/are affected. In this case, it is sufficient to focus only on the electrical parameter in question. As a result, the comparison can be restricted to this one electrical parameter. Analysis of ultrasound sensors to determine their states can be simplified and accelerated.

Another variant of this invention provides for the predefined states of the diaphragm to mean that the diaphragm is covered with ice or with a contaminant. In this case, the predefined states are defined. In particular, they have already been defined or established in advance. This means, in particular, that reference data or reference measurements exist for these defined states. A comparison with the electrical parameters determined from step g) can be made on the basis of these reference measurements or reference parameters. This means, for example, that there may be a plurality of reference parameters for different degrees of coverage of the diaphragm with ice. If electrical parameters are determined in step g), these can be compared with the already existing predefined reference parameters. This comparison makes it possible to determine whether the diaphragm is covered with ice. If there are a plurality of reference parameters for different degrees of ice coverage, it can even be determined how much the diaphragm is iced up. An analogous procedure is also possible with regard to a diaphragm with contaminants. In this way, it can not only be stated whether the diaphragm is contaminated, but even how heavily the diaphragm is contaminated. A degree of soiling can thus be determined. Likewise, a degree of coverage of the diaphragm with ice can be determined in a similar manner.

Another variant of the invention provides for the predefined states of the diaphragm to mean a temperature of the diaphragm. Instead of analyzing blocked states of the diaphragm, this variant can provide for a temperature of the diaphragm to be determined. If, for example, the ultrasound sensor is operated outside its permissible temperature range, its measurement results can be classified as uncertain. A driver can be informed of unreliable measurements by the ultrasound sensor by means of a corresponding warning message.

Another variant of this invention provides for a degree of coverage and/or a degree of soiling of the diaphragm to be determined on the basis of the at least one determined electrical parameter in order to quantitatively determine the state of the diaphragm. This is achieved, in particular, by the fact that there may be a plurality of reference parameters for a plurality of predefined states. Thus, in step g), it is not only possible to determine whether the diaphragm is contaminated, damaged or covered with ice, but the extent of the damage or contamination can also be determined. If the diaphragm is covered with ice, it is therefore possible to state how thick the layer of ice on the diaphragm is. It is also possible to determine how thick a layer of contaminants on the diaphragm is. Under certain circumstances, a profile of a layer of ice on the diaphragm can even be determined.

Another variant of this invention provides for a warning signal to be generated in the event of a damaged or soiled diaphragm. If the diaphragm of the ultrasound sensor is damaged or soiled, the function of the ultrasound sensor is usually impaired. This means that its measurements or measurement results can be unreliable. In this case, it makes sense for a driver of a motor vehicle to be warned of unreliable ultrasound sensors. The warning signal can be optical, haptic and/or acoustic. The driver of the motor vehicle can thus be shown which ultrasound sensors are not functioning correctly or which ultrasound sensors have failed and should be replaced. This can enable a faster repair service since there is no need to look for defective ultrasound sensors.

Another variant of this invention provides for the third voltage profile to be determined in step f) by averaging the first and second voltage profiles. The averaging is preferably carried out on the basis of the shifted voltage profiles from step e). This means that, in step f), the respective voltage profiles that result from the shifting of the first and second voltage profiles are meant, in particular. The third voltage profile preferably runs between the shifted first voltage profile and the shifted second voltage profile. In this variant, however, provision is made for the voltage profile to be placed exactly in the middle between the two shifted voltage profiles. It is therefore possible to achieve the situation in which the up-chirp signal and the down-chirp signal are weighted equally. However, it is also possible to weight these two different excitation signals differently in a targeted manner using different weighting factors. This variant therefore also includes averaging which has weighting factors. However, provision is preferably made for no weighting factor to assume the value zero.

Another variant of this invention provides for the first direction to be opposite to the second direction when shifting the voltage profiles in step e). The first direction is diametrically opposed to the second direction, in particular. The first direction can be converted into the second direction by rotating it through 180 degrees. In particular, the first and second directions can be horizontal. It can thus be ensured that no frequency distortion takes place in the further course of the method. It is therefore possible to determine the state of the ultrasound sensor in a more reliable manner.

The present application also provides an analysis system for a motor vehicle. This analysis system has an ultrasound sensor having a diaphragm. The analysis system also includes a signal generation unit for generating a first excitation signal and a second excitation signal for exciting the diaphragm of the ultrasound sensor. Furthermore, the analysis system has an evaluation unit which is designed to carry out a method according to one of the previous variants or examples. The variants, examples and advantages described and mentioned so far also analogously apply to the analysis system.

Another embodiment provides an analysis system, wherein the first excitation signal is in the form of a down-chirp signal and the second excitation signal is in the form of an up-chirp signal. The examples and definitions mentioned for the down-chirp signal and the up-chirp signal analogously apply to this variant of the invention. These two excitation signals are preferably generated by the signal generation unit. This means that the diaphragm of the ultrasound sensor can be excited differently. Depending on which chirp signal is used, a different state of the diaphragm can be detected. For example, a specific chirp signal can be provided for temperature analysis of the diaphragm. In this way, certain states of the diaphragm can be examined in a targeted manner. A needs-based analysis system for the diaphragm can thus be created and used.

Another variant of this invention provides a vehicle assistance system having an analysis system. In this way, the respective states of the ultrasound sensors can be determined within the vehicle assistance system. This information can be bundled within the vehicle assistance system together with other additional information from other analysis systems. The analysis system can thus determine important information relating to the states of the ultrasound sensors and make it available to the vehicle assistance system.

In the context of this application, a motor vehicle having a vehicle assistance system is also proposed. Based on the knowledge of the states of the respective ultrasound sensors, the operation of the motor vehicle can be designed to be safer and more efficient.

This application also proposes a computer program product having program code means which are stored in a computer-readable medium in order to carry out the method according to one of the previous variants when the computer program product is executed on a processor of an electronic evaluation unit. The computer program product can be integrated in the on-board electronics of a motor vehicle. It is therefore not absolutely necessary to provide separate digital resources for determining a state of the diaphragm.

The signal generation unit can be in the form of a piezo actuator or piezo element. As a rule, the first excitation signal is configured differently from the second excitation signal. In particular, the frequency of the first excitation signal can differ from the frequency of the second excitation signal. This can also apply to the amplitude or phase. The first excitation signal can thus have a different amplitude profile than the second excitation signal. The same can also apply to the phase. This application provides, in particular, for the diaphragm to be excited with excitation signals, the frequency of which is not constant over time. In the further course of the method, however, a so-called constant wave model is preferably used. The constant wave model corresponds to the model for continuous excitation of the diaphragm.

Further features of the invention emerge from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as included and as disclosed. Embodiments and combinations of features that therefore do not have all the features of an independent claim as originally worded are also intended to be regarded as disclosed. Furthermore, embodiments and combinations of features that go beyond or differ from the combinations of features set out in the back-references of the claims should be considered to be disclosed, in particular by the embodiments set out above.

Figure 1:
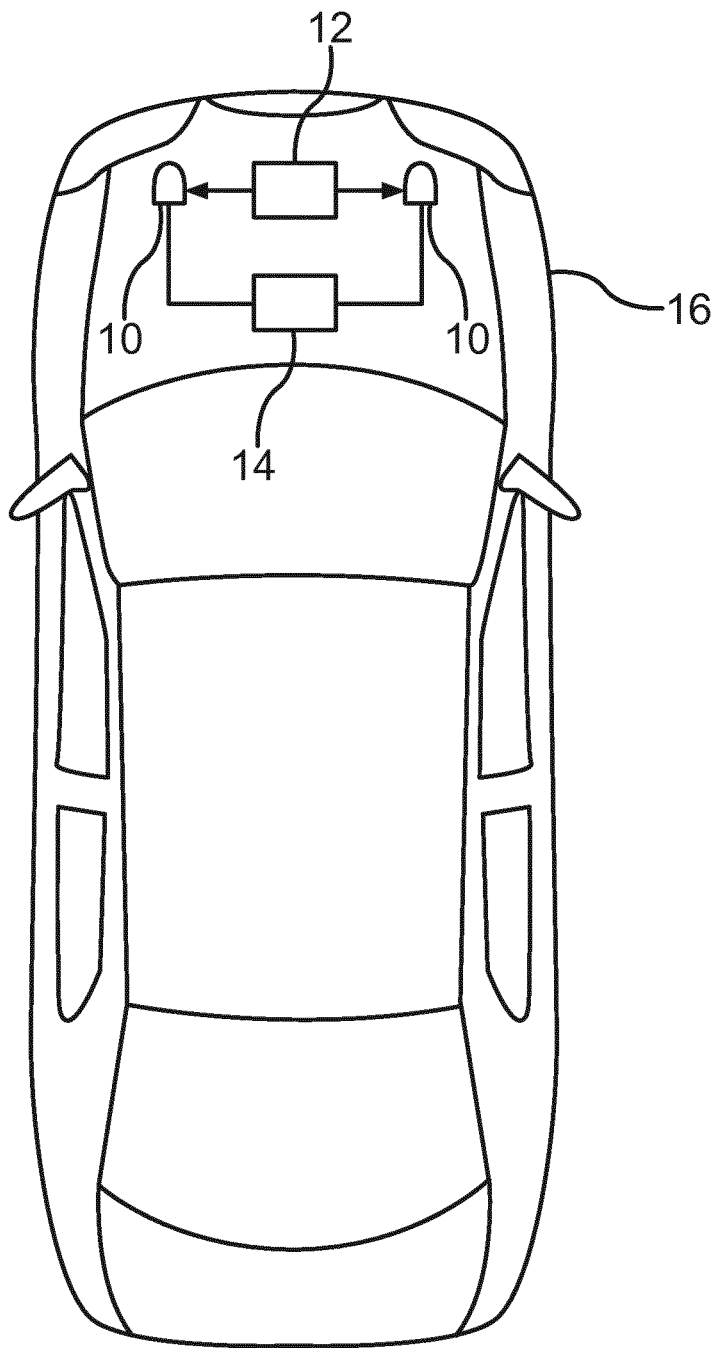
FIG. 1 shows a motor vehicle having an analysis system.

FIG. 1 shows a motor vehicle 16 having an analysis system. This analysis system has a plurality of components. These include an ultrasound sensor 10, an evaluation unit 14 and a signal generation unit 12. The motor vehicle 16 can be in the form of an automobile, in particular. The ultrasound sensors 10 can be arranged not only in the front area of the motor vehicle 16, as shown, but also in the rear area (trunk) of the motor vehicle 16. The ultrasound sensors 10 can be in the form of parking sensors, in particular. Such parking sensors are preferably used to safely park the motor vehicle 16.

Figure 2:
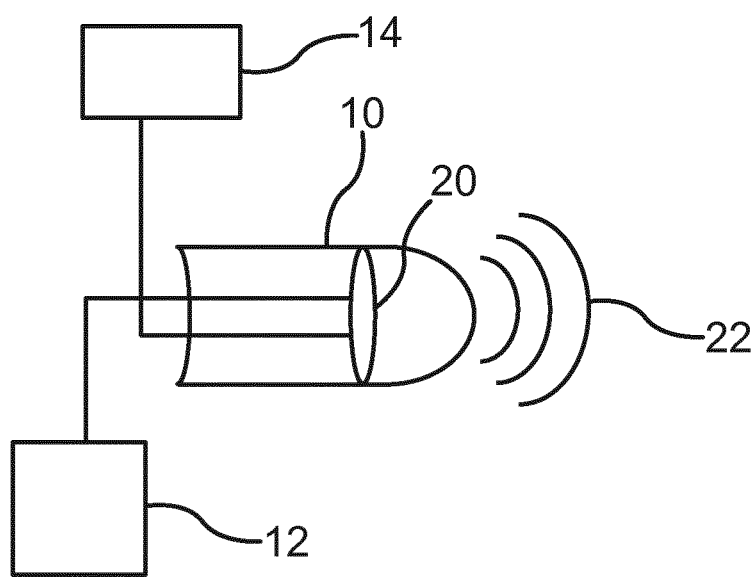
FIG. 2 shows a schematic drawing of an ultrasound sensor having a diaphragm.
Figure 3:
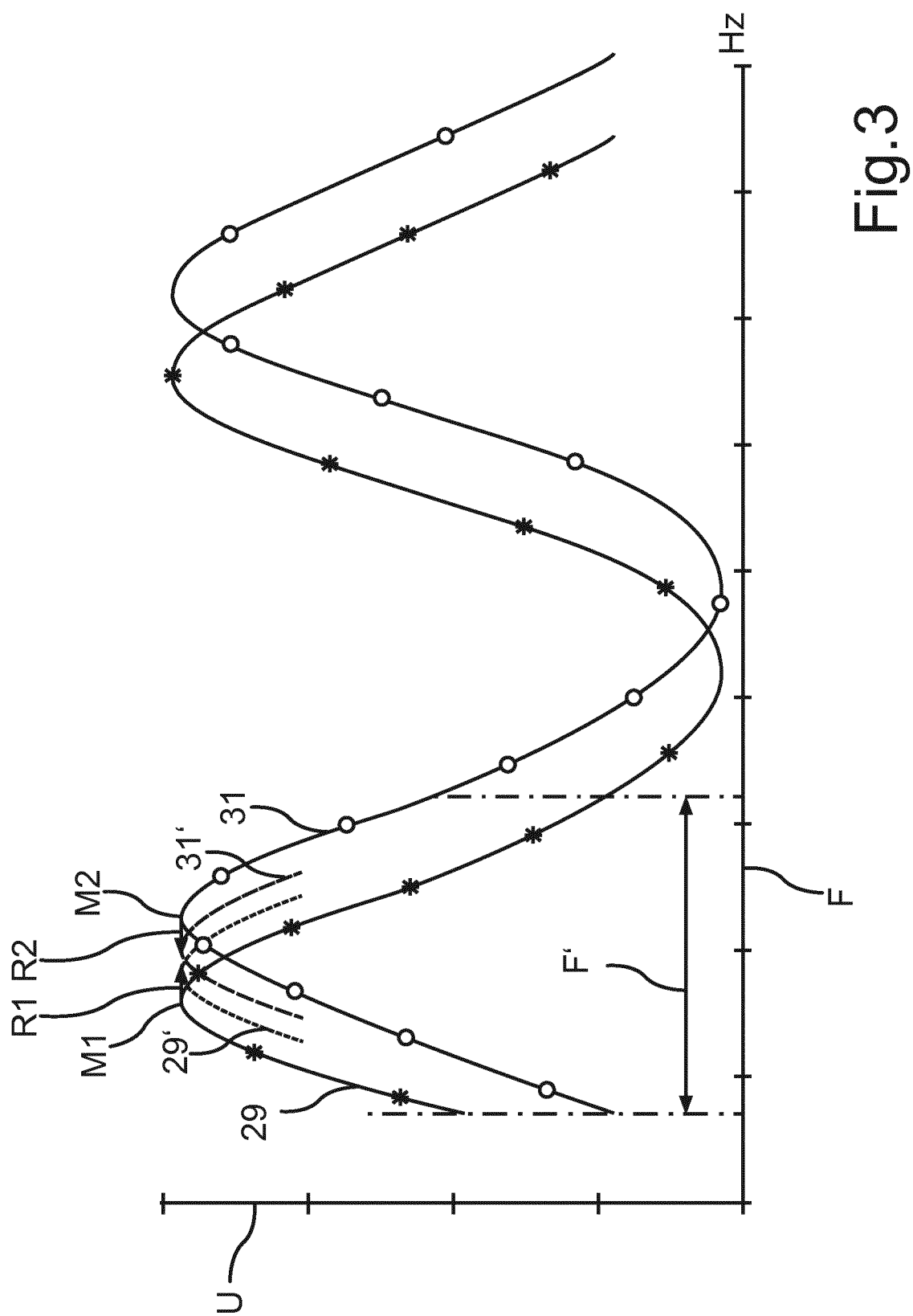
FIG. 3 shows a graph with a first voltage profile and a second voltage profile as well as partially corresponding shifted voltage profiles.

FIG. 2 schematically shows the ultrasound sensor 10 in a larger representation. The ultrasound sensor 10 is designed, in particular, to emit ultrasound waves 22. These ultrasound waves 22 are illustrated schematically in FIG. 2 by indicated wavy lines. The ultrasound sensor 10 has a diaphragm 20. This diaphragm 20 can be excited by the signal generation unit 12. This means that the signal generation unit 12 can make the diaphragm vibrate. Due to the vibrations of the diaphragm 20, the ultrasound waves 22 can thus be generated. In particular, the signal generation unit 12 can generate the first excitation signal and the second excitation signal and can thus excite the diaphragm 20. Up-chirp signals and/or down-chirp signals are preferably used to excite the diaphragm. The evaluation unit 14 is designed, in particular, to measure deflections of the diaphragm 20. These diaphragm deflections are often registered in the form of a voltage or a voltage signal. FIG. 3 shows, by way of example, a first voltage profile 29 caused by the first excitation signal and a second voltage profile 31 caused by a second excitation signal. These two excitation signals cause the voltage profiles 29, 31 as a function of a frequency F in FIG. 3. In this case, the first voltage profile 29 caused by the first down-chirp excitation signal. The second up-chirp excitation signal causes the second voltage profile 31. The x-axis represents the frequency F, the y-axis a voltage U. For a predefined frequency range F', a first maximum M1 and a second maximum M2 of the first and second voltage profiles 29 and 31, respectively, are entered. These two maxima M1 and M2 are each shifted. The first maximum M1 is shifted along a direction R1 and the second maximum M2 is shifted along a direction R2. The amount of the respective shifts is identical. This means that the shift direction R1 has the same length as the shift direction R2.

The two maxima M1 and M2 are accordingly shifted by the same amount with respect to each other. They are preferably shifted in such a way that these two maxima M1, M2 merge into one point. This preferably leads to shifted voltage profiles 29' and 31', the maxima of which coincide at a single point. In this case, the first maximum M1 is shifted to the right and the second maximum M2 is shifted to the left. The two directions R1 and R2 are horizontal in the example of FIG. 3. These shifts result in two shifted voltage profiles 29', 31'. These two shifted voltage profiles 29', 31' can be converted into a new third voltage profile 30. The third voltage profile 30 runs between the shifted first voltage profile 29' and the shifted second voltage profile 31'. For reasons of clarity, the associated shifted voltage profiles are not illustrated in full in FIG. 3. In particular, the third voltage profile 30 is determined from these two shifted voltage profiles by averaging.

Figure 4:
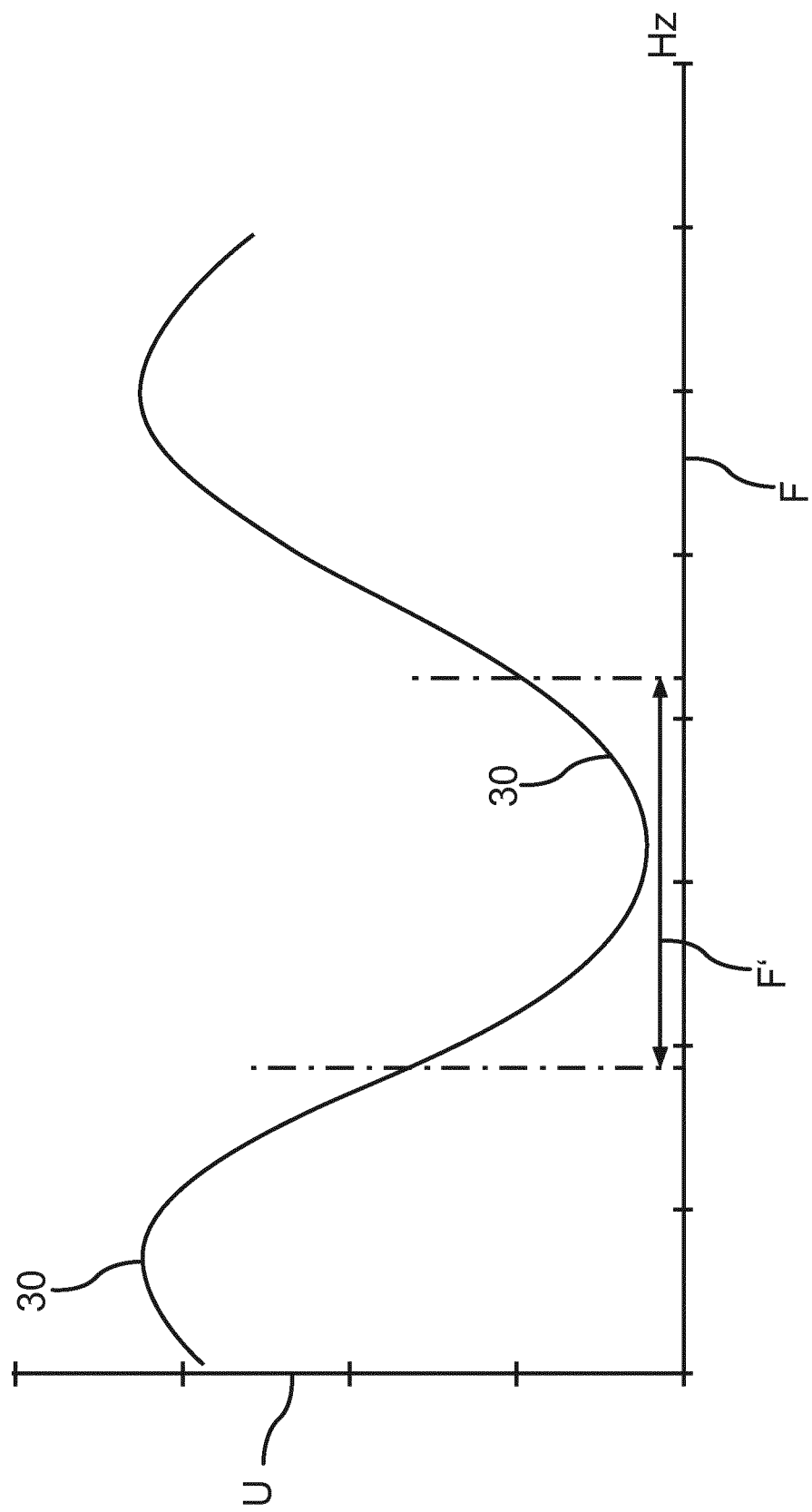
FIG. 4 shows a graph with a third voltage profile.

This third voltage profile 30 is shown in FIG. 4. The third voltage profile 30 is plotted as a voltage profile against the frequency F. This third voltage profile 30 is then used to determine the state of the diaphragm 20. There are various possibilities for this.

In the simplest case, a resonant frequency of the diaphragm 20 represented by the third voltage profile 30 is determined. This is, in particular, a minimum of the third voltage profile 30 in a predefined frequency range F'. This resonant frequency of the diaphragm can be compared with a predefined resonant frequency. The predefined resonant frequency relates to predefined or defined states of the diaphragm 20. These predefined states of the diaphragm 20 can include, for example, the diaphragm 20 being covered with ice or with soiling. However, it is also possible for these defined states to mean a temperature of the diaphragm 20 or damage to the diaphragm 20. Instead of determining a resonant frequency, however, a model for continuous excitation of the diaphragm 20 can also be used in order to determine the state of the diaphragm 20. For example, formula 1 is used for this purpose. The electrical parameters mentioned in formula 1 are adapted or adjusted in such a way that the third voltage profile 30 is simulated. Various optimization algorithms can be used for this purpose. For example, the Nelder-Mead or the Gauss-Newton method can be used to determine the respective electrical parameters. Once the electrical parameters have been determined, they can be compared with predefined reference parameters. For this purpose, exactly one reference parameter can be selected for the comparison. As a rule, this is that parameter which exhibits the greatest deviation from its predefined reference parameter.

However, provision may also be made for a Euclidean distance to be determined between all electrical parameters and all predefined electrical parameters. In particular, provision may be made for a square of the distance to be calculated in each case. This makes it possible to prevent opposing deviations from adding up to 0. Otherwise, this could produce a distorted result. Ideally, there is a database which has a plurality of reference parameters for different predefined states of the diaphragm. If the database is large enough, the state of the diaphragm can also be additionally determined quantitatively in addition to the pure determination of the state. For example, it is possible to determine how heavily the diaphragm 20 is soiled or how much ice a diaphragm 20 is covered with. A thickness of a layer of ice on the diaphragm 20 of the ultrasound sensor can be determined.

Figure 5:
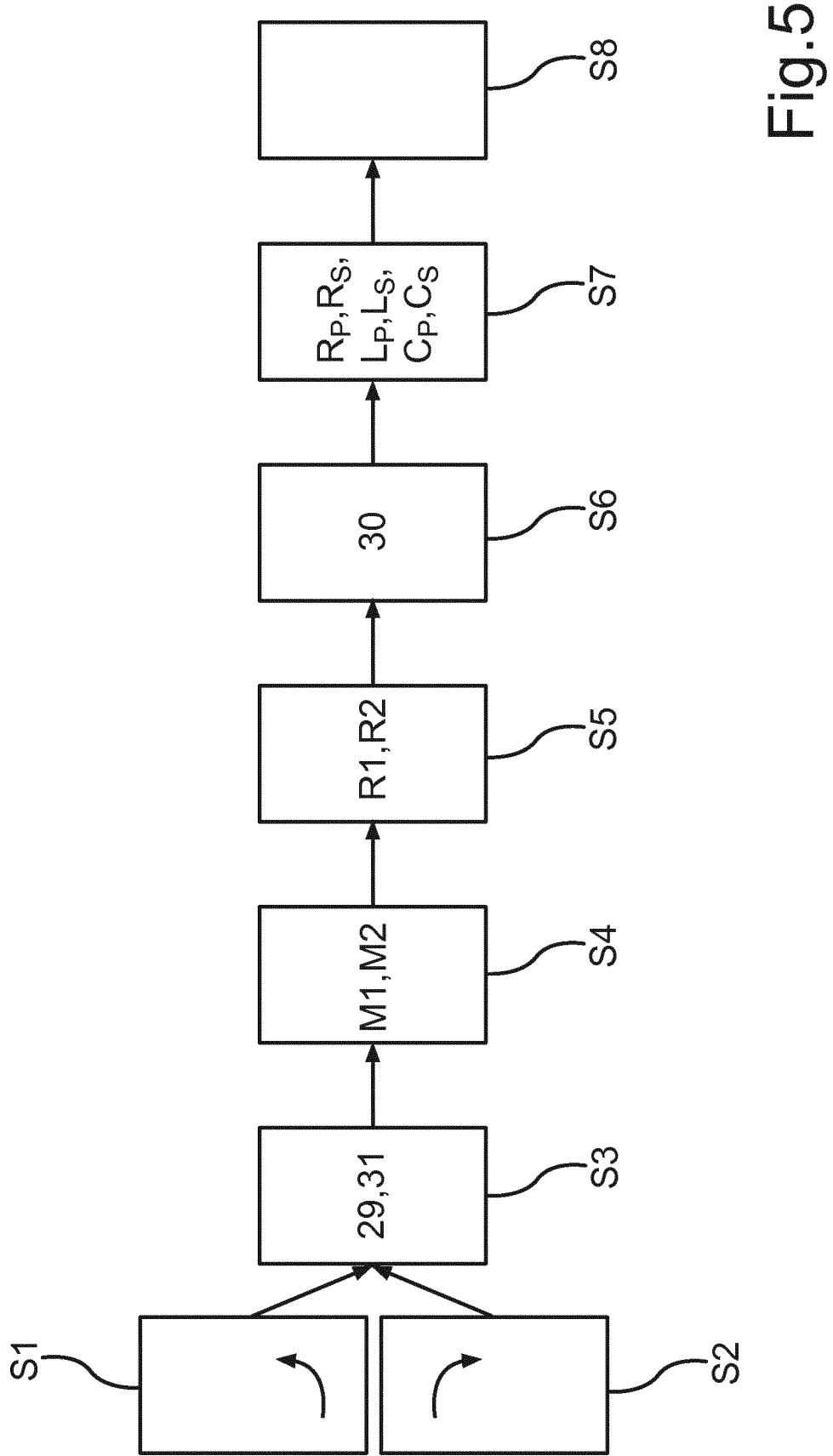
FIG. 5 shows an exemplary flowchart for a better illustration of method steps.

FIG. 5 shows, by way of example, an overview of some method steps. In a step S1 and a step S2, the diaphragm 20 is excited with an up-chirp signal and a down-chirp signal, respectively. The up-chirp signal is indicated by an arrow bent upward. Correspondingly, the arrow bent downward symbolizes the down-chirp signal. On the basis of these two excitation signals, the diaphragm 20 is excited to vibrate in a step S3. In particular, provision is made for the first excitation signal to be generated before the second excitation signal. The diaphragm 20 is therefore preferably not excited by the two excitation signals at the same time. On the basis of these excitations of the diaphragm 20, two different voltage profiles representing different vibrations of the diaphragm 20 can be measured in step S3.

In a step S4, as shown in FIG. 3, the positions of the two maxima M1 and M2 can be determined. This can be done using simple and common algorithms. These two maxima M1 and M2 are, in particular, those points at which the derivative of the first voltage profile 29 and of the second voltage profile 31 is zero.

In a step S5, the positions of the two maxima are shifted by the same amount. The two shift directions are opposite to each other. In particular, the first direction R1 can be horizontal and point to the right. The second direction R2 is accordingly also oriented horizontally and to the left.

The third voltage profile 30 is determined in a step S6. This is preferably carried out by averaging the shifted voltage profiles 29' and 31'. It should be noted here that the averaging does not relate to the original first voltage profile 29 and the original second voltage profile 31. The third voltage profile is preferably determined on the basis of the shifted first voltage profile 29' and on the basis of the shifted second voltage profile 31'. These two voltage profiles are only indicated in FIG. 3 with 29' and 31', respectively, in order to ensure clarity.

In a step S7, electrical parameters of the model for continuous diaphragm excitation can be determined. Formula 1 is used for this purpose, for example. The respective electrical parameters can be determined using mathematical optimization algorithms. A comparison of these determined electrical parameters with predefined reference parameters makes it possible to precisely determine a state of the diaphragm 20. Blocked states of the diaphragm 20 can thus be detected. However, other states, for example a temperature of the diaphragm 20 or a degree of coverage of the diaphragm 20 with ice, can also be determined.

With the aid of the electrical parameters, it is not only possible to detect different states of the diaphragm 20, but the model for continuous excitation of the diaphragm 20 can also describe a sensor behavior. This sensor behavior can be used, for example, to compensate for level fluctuations or to enable temperature compensation of the ultrasound sensor 10.

The invention claimed is:

1. A method for determining a state of a diaphragm of an ultrasound sensor during operation of the ultrasound sensor, the method comprising:
   applying a first excitation signal in a predefined first frequency profile to the diaphragm of the ultrasound sensor;
   measuring a first voltage profile, which is caused by the first excitation signal, as a function of a frequency of the first excitation signal;
   applying a second excitation signal, which has a second frequency profile that differs from the first frequency profile, to the diaphragm of the ultrasound sensor;
   measuring a second voltage profile, which is caused by the second excitation signal, as a function of a frequency of the second excitation signal;
   shifting the first voltage profile by an amount in a first direction and shifting the second voltage profile by the same amount in a second direction, so that respective positions of maxima of the two voltage profiles are matched to each other in a predefined frequency range;

determining a third voltage profile which runs between the shifted first voltage profile and the shifted second voltage profile; and determining the state of the diaphragm by comparing the third voltage profile to a predefined reference voltage profile, and/or determining the state of the diaphragm by determining at least one electrical parameter of a model for continuous excitation of the diaphragm and comparing at least one parameter with at least one predefined reference parameter.

2. The method as claimed in claim 1, wherein the first excitation signal is in the form of a down-chirp signal and the second excitation signal is in the form of an up-chirp signal.

3. The method as claimed in claim 1, wherein the state of the diaphragm is additionally or alternatively determined on the basis of a comparison of a resonant frequency of the diaphragm represented by the third voltage profile as the at least one parameter with a predefined resonant frequency as the predefined reference parameter.

4. The method as claimed in claim 1, wherein the model for continuous excitation of the diaphragm has a first resistance, a first inductance and a first capacitance in a parallel circuit and a second resistance, a second inductance and a second capacitance in a series circuit as the electrical parameters of the model.

5. The method as claimed in claim 1, wherein reference parameters are predefined for predefined states of the diaphragm and that exactly one electrical parameter of the model which has the greatest deviation from its associated reference parameter is compared with the associated reference parameter in order to determine the state of the diaphragm.

6. The method as claimed in claim 5, wherein the predefined states of the diaphragm mean that the diaphragm is covered with ice or a contaminant.

7. The method as claimed in claim 5, wherein the predefined states of the diaphragm mean a temperature of the diaphragm.

8. The method as claimed in claim 1, wherein a degree of coverage and/or a degree of soiling of the diaphragm is/are determined on the basis of the at least one determined electrical parameter in order to quantitatively determine the state of the diaphragm.

9. The method as claimed in claim 1, wherein a warning signal is generated in the event of a damaged or soiled diaphragm.

10. The method as claimed in claim 1, wherein the third voltage profile is determined by averaging the first and second voltage profiles.

11. The method as claimed in claim 1, wherein the first direction is opposite to the second direction when shifting the voltage profiles.

12. An analysis system for a motor vehicle, comprising:

an ultrasound sensor having a diaphragm;

a signal generation unit for generating a first excitation signal and a second excitation signal for exciting the diaphragm of the ultrasound sensor; and an evaluation unit which is configured to carry out a method as claimed in claim 1.

13. The analysis system as claimed in claim 12, wherein the first excitation signal is in the form of a down-chirp signal and the second excitation signal is in the form of an up-chirp signal.

14. A vehicle assistance system having an analysis system as claimed in claim 12.

15. A computer program product having program code means which are stored in a computer-readable medium in order to carry out the method as claimed in claim 1, when the computer program product is executed on a processor of an electronic evaluation unit.

* * * * *